March 21, 1961  F. E. CROY  2,976,064
FLEXIBLE JOINT ARRANGEMENTS
Filed June 26, 1959  3 Sheets-Sheet 1
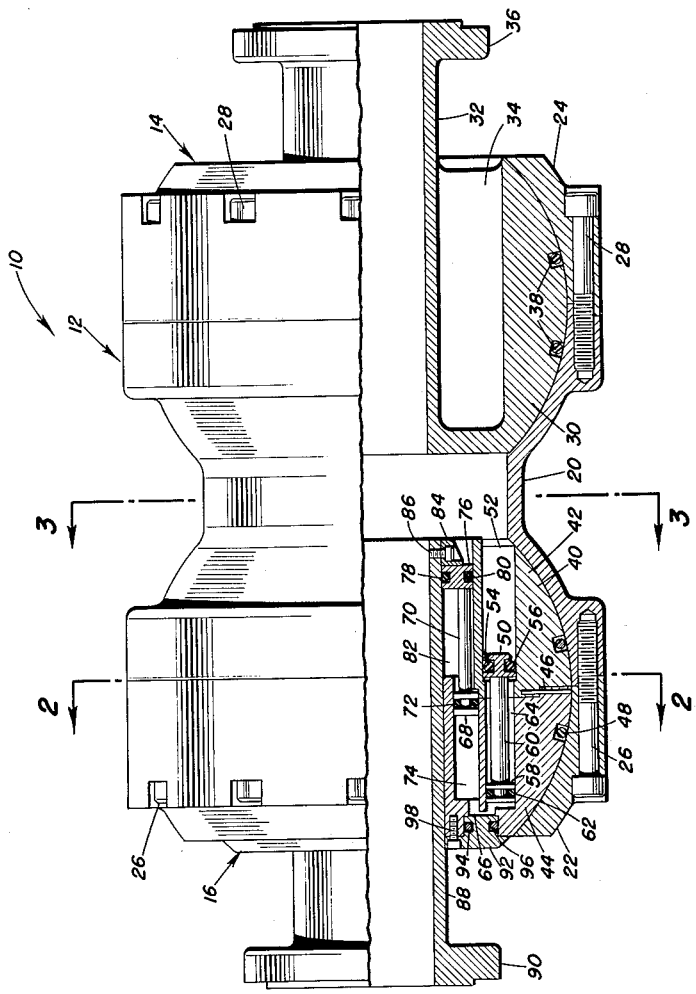
FRED E. CROY
INVENTOR.
BY Walter G. Finch
ATTORNEY March 21, 1961  F. E. CROY  2,976,064
FLEXIBLE JOINT ARRANGEMENTS Filed June 26, 1959  3 Sheets-Sheet 2

FRED E. CROY
INVENTOR.

BY Walter G. Finch
ATTORNEY

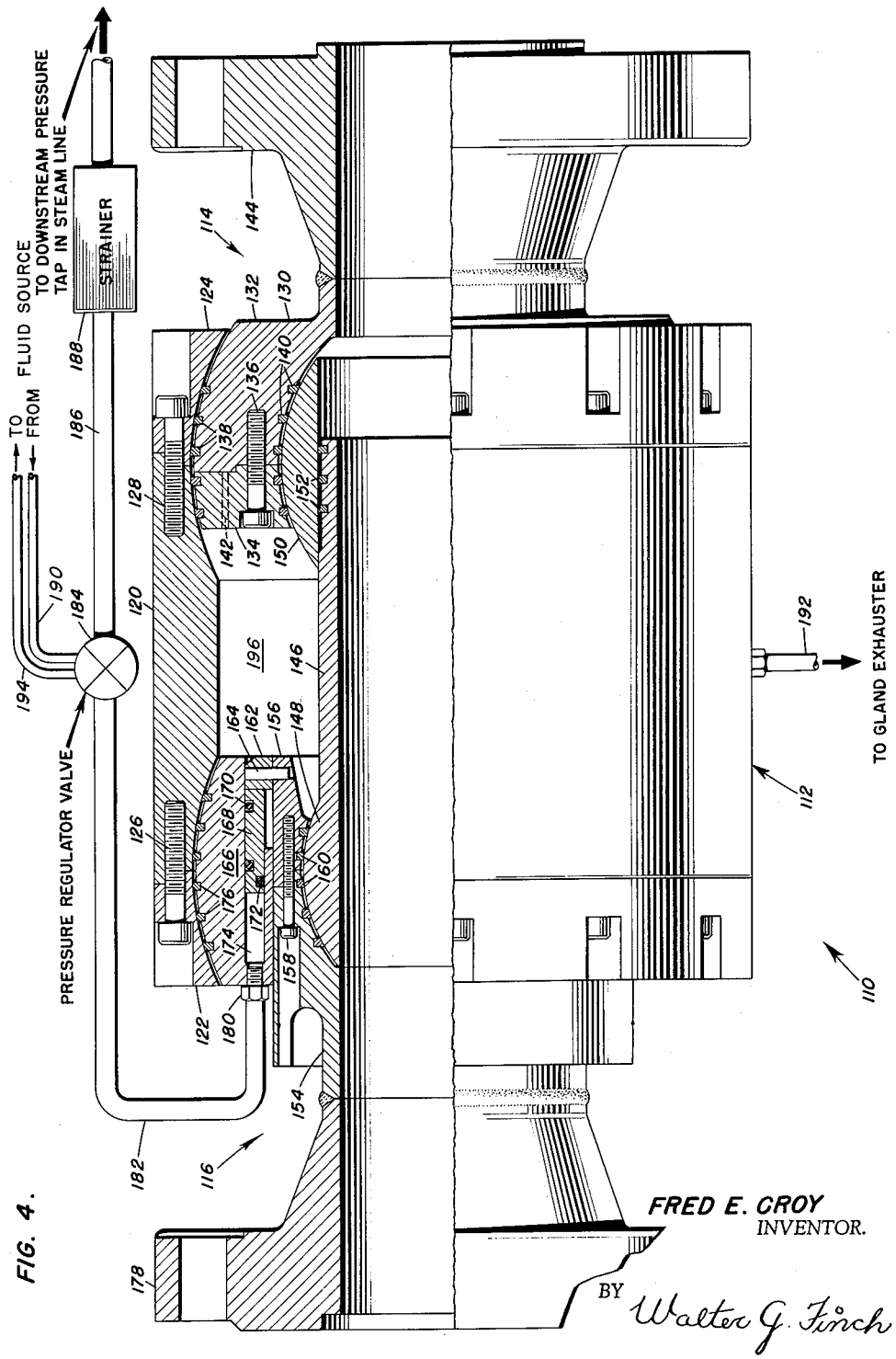

United States Patent Office 2,976,064
Patented Mar. 21, 1961

1

2,976,064

FLEXIBLE JOINT ARRANGEMENTS

Fred E. Croy, Annapolis, Md., assignor, by mesne assignments, to Ultradyne, Incorporated, Albuquerque, N. Mex., a corporation of New Mexico Filed June 26, 1959, Ser. No. 823,118

4 Claims. (Cl. 285—165)

This invention relates generally to pipe joints, and, more particularly, it pertains to combination expansion and flexible joint arrangements for high pressure fluid piping.

Flexibility is often required in a pipe joint to compensate for variations in location dimensioning of associated equipment to take up vibratory movement or to avoid destructive strains. For similar reasons and also to compensate for thermal expansion, a sliding or expansion joint may be indicated. In the case of large diameter, high pressure lines, a strong piston effect is commonly encountered which tends to destructively force the joint apart.

It is an object of the present invention, therefore, to provide a compact combination flexible joint and expansion fitting for high pressure pipe which furnishes flexibility in a lateral direction without requiring departure from parallelism of the attached conduit.

Another object of this invention is to provide self-compensation for end thrust in a flexible joint and expansion fitting for pipe.

Still another object of this invention is to provide a flexible linear and angular motion high pressure pipe joint which can be externally controlled for end thrust compensation.

These and other objects and advantages of this invention will become more readily apparent and understood from the accompanying specification and drawings in which:

Fig. 1 is a side elevation, partly in section, of an improved flexible pipe joint having self-contained anti-thrust provision incorporating features of this invention;

Fig. 4 illustrates in side elevation, partly in section, a novel pipe coupling with anti-thrust pressure provided from an external fluid system shown diagrammatically.

Figure 3:
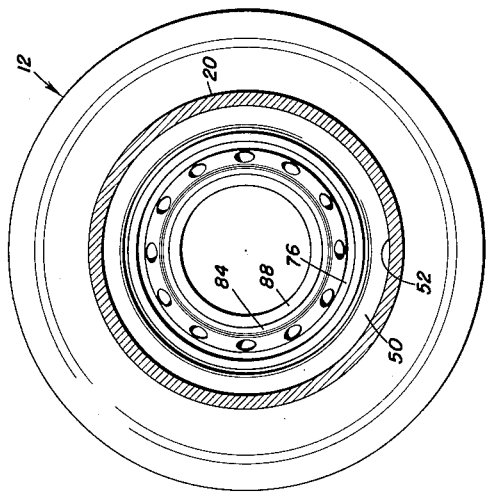
Fig. 3 is a cross-section taken along line 3—3 of Fig. 1.
Figure 2:
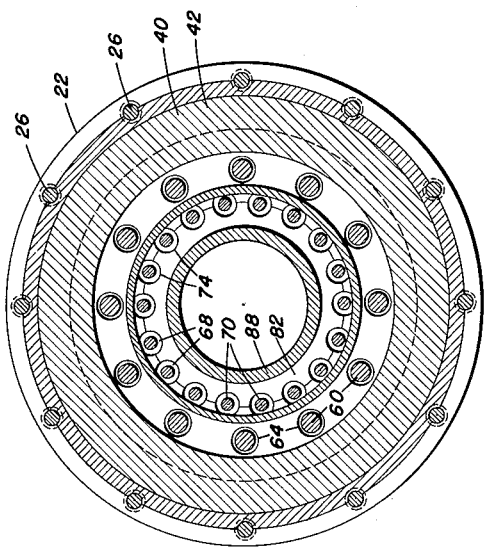
Fig. 2 is a cross-section taken along line 2—2 of Fig. 1.

Referring now to Figs. 1, 2, and 3 of the drawings and particularly Fig. 1, there is illustrated generally a flexible pipe device 10 intended for joining water pressure lines and the like. Device 10 consists of a tubular casing 12 which receives a rocker assembly 14 at one of its ends and another rocker assembly 16 at its other end.

Casing 12 is made up of a central sleeve 20 which may be reinforced with webs (not shown) for additional strength, and a pair of bolted-on end bells 22 and 24 secured by a plurality of spaced cap screws 26 and 28.

The rocker assembly 14 has a ball 30 secured to a tube 32. Ball 30 may be solid or hollowed out, as shown, with spaced strengthening webs 34 and it is dimensioned to fit in a ball-and-socket fashion against the flared end of central sleeve 20. Annular O-rings 38 are provided for sealing around the periphery of the ball 30. The tube 32 is provided with a coupling flange 36. It is thus to be noted that the rocker assembly 14 is captivated by the end ball 24 but yet has angular freedom of movement.

The left rocker assembly 16 of the device 10, as illustrated in Fig. 1, also has ball-and-socket freedom of motion within sleeve 20 which is derived from a movable ball 40. Ball 40 is split circumferentially into two halves 42 and 44, facilitating further assembly to be described, and are rabbeted and joined together by means of a plurality of drive pins 46. Annular O-rings 48 are provided around the periphery of the ball 40 for sealing purposes.

Within a double-walled arcuate chamber 52 in ball 40 and communicating with the interior of central sleeve 20, there is provided a movable ring-shaped master piston 50 equipped with annular O-rings 54 and 56. This master piston 50 and its chamber 52 are more clearly shown in Fig. 3.

A plurality of spaced cylinders 64, as shown in Figs. 1 and 2, are bored longitudinally on a diameter into the ball 40 at equally spaced intervals at the end of the chamber 52. Each cylinder 64 has an idler piston 58 joined by a piston rod 60 to the master piston 50. O-rings 62 are provided for each idler piston 58 and all cylinders 64 open into a passage 66.

This passage 66 communicates with another plurality of cylinders 74 longitudinally bored on a yet smaller diameter within ball 40. Working within each cylinder 74 is a secondary piston 68 equipped with an O-ring 72 and a piston rod 70. Each piston rod 70 is attached to a ring-shaped slave piston 76 provided with annular O-rings 78 and 80 and working within a double-walled arcuate chamber 82.

The slave piston 76 presses against a stop ring 84 which is secured by cap screws 86 to a tube 88. Tube 88 is slidable concentrically within ball 40 and it is provided with a coupling flange 90.

The passage 66 is accessible by means of a backing plate 92. In this way, the cylinders 64 and 74, as well as the passage 66, are charged with a hydraulic fluid. The backing plate 92 is prevented from leaking by means of annular O-rings 94 and 96, and it is secured to ball 40 with cap screws 98. The end bell 22 captivates the rocker assembly 16, but yet permits considerable angular movement thereof.

In use, the flexible pipe device 10 is inserted in a circuit of pipe and is joined thereto by means of the flanges 36 and 90. The rightward and leftward pipe circuits need not be co-linear or parallel because the double ball and socket effect allows for considerable angular as well as offset configuration between the two tubes 32 and 88. Further, the sliding arrangement of tube 88 gives longitudinal freedom within limits and is constrained by the stop ring 84 and piston 76.

The pressure of the fluid being transported by the device 10 tends to force the tubes 32 and 88 to separate. However, this same fluid pressure acts upon the piston 50 to move piston rods 60 and pistons 58. Hydraulic fluid is thus forced from cylinders 64 through passage 66 into cylinders 74. Pistons 68 and their rods 70 are thereby urged to move the slave piston 76 more firmly against the stop ring 84.

By suitably proportioning the various cylinder head areas or changing the number of cylinders involved in this action, the expansion effect of the joint may be cancelled out or even made negative, if desired.

Because of the adverse effects of some conducted fluids upon the working pistons and their associated components of the flexible pipe device, it may be desirable to obtain the compensating pressure from some other source or perhaps to filter it from contaminants. To this end, a modified flexible pipe device 110 is employed, as shown in Fig. 4. This device 110 is provided with a casing 112 and a pair of sliding and nonsliding rocker assemblies 116 and 114, respectively, socketed against a central sleeve 120. A pair of end bells 124 and 122 secured by cap screws 128 and 126 captivate, respectively, a spherical portion 130 of rocker assembly 114 and a sliding ball 166 of rocker assembly 116.

The spherical portion 130 is circumferentially split into two halves 132 and 134 which are rabbeted and held together by cap screws 136. Annular seal rings 138 are recessed into the outer surface of spherical portion 130, as shown. The inner surface of portion 130 is contoured to fit a free ball 150 and also provided with seal rings 140. A bleed hole 142 communicates with the split between ball halves 132 and 134. A flange 144 is welded to the ball half 132 after the end bell 124 is in place.

The free ball 152 has sliding within it a slip tube 146 whose other end is provided with a fixed ball 148. Seal rings 152 provide a fluid-tight seal between the tube 146 and free ball 150.

The rocker assembly 116 has a pair of halves 154 and 156 held together with cap screws 158. The halves 154 and 156 are contoured to the surface of fixed ball 148. Seal rings 160 provide fluid sealing therebetween. A stop ring 162 is pinned to the half 156 by means of dowels 164.

A free annular piston 168 is arranged to slide in an annular chamber 174 machined into the sliding ball 166. Piston 168 is provided with annular O-rings 170 and 172, and it contacts the stop ring 162 at one end. The ball 166 is grooved on its concave surface for a plurality of seal rings 176. After the end bell 122 is in place, a flange 178 is welded to half 154. Finally, a fitting 180 for a line 182 is tapped into the annular chamber 174.

It will be noted that the pressure of the conducted fluid tends to force the flanges 144 and 178 apart. In this tendency the flange 178 is acting integrally with slip tube 146, halves 154 and 156 and the stop ring 162. Tending to move in the other direction with flange 144 is the spherical portion 130, the free ball 150, the central sleeve 120 and the sliding ball 166. With piston 168 against the stop ring 162, the chamber 174, therefore, is subject to volumetric change. This change may be opposed by fluid pressure from an external source controlled, as shown, for example, from a downstream pressure tap in the steam line, if that is the fluid being transported.

This steam pressure, after passing through a strainer 188, is fed by a tap line 186 to the controlling element of a two-way pressure regulator valve 184 which either takes fluid pressure from line 190 or returns it through line 194. The pressure of fluid in line 182 and, consequently, that in the chamber 174, is thus made proportional to the pressure of the transported fluid within tube 146.

To prevent trapping a pressure from fluid leakage into the working space 196, a line 192 communicating therewith may be connected to a gland exhauster, as shown.

Obviously, many modifications and variations of the present invention are possible in light of the above teachings. It is, therefore, to be understood that within the scope of the appended claims, the invention may be practiced otherwise than as specifically described.

What is claimed is:

1. A flexible and expandable joint arrangement for joining relatively misaligned or relatively movable fluid conduits together, comprising, structure defining a tubular casing, a rocker assembly positioned at opposite ends of said tubular casing, with each of said rocker assemblies having means for connecting to one of said fluid conduits, one of said connecting means of one of said rocker assemblies being arranged to slide with respect to the connecting means of the other of said rocker assemblies, and means arranged to cooperate with one of said rocker assemblies and said slidable connecting means to compensate for expansion forces caused by conducted fluid, said compensating means including a master piston device and a slave piston device, said master piston device having an annular piston connected to a plurality of circumferentially equally spaced pistons acting in unison on said slave piston device to multiply the compensating forces so as to proportion the opposing forces caused by the thrust of the conducted fluid, whereby relatively misaligned or relatively movable fluid conduits can be joined together to form a continuous flexible, expansion type joint arrangement.

2. An arrangement as recited in claim 1, wherein said compensating means is actuated by the forces of said conducted fluid.

3. An arrangement as recited in claim 1, and additionally a source of pressure for actuating said compensating means.

4. An arrangement as recited in claim 1, and additionally means for controlling the external source of pressure for actuating said compensating means.

References Cited in the file of this patent

UNITED STATES PATENTS

| 853,974 | Hayden | May 21, 1907 |
| 943,904 | Struer | Dec. 21, 1909 |
| 1,074,877 | Leighty | Oct. 7, 1913 |
| 2,109,546 | McLagan | Mar. 1, 1938 |
| 2,514,588 | Nystrom | July 11, 1950 |
| 2,616,255 | Altorfer | Nov. 4, 1952 |

FOREIGN PATENTS

| 455,037 | Italy | Feb. 10, 1950 |